United States Patent [19]

Isshiki et al.

[11] Patent Number: 5,529,545
[45] Date of Patent: Jun. 25, 1996

[54] TOOTHED BELT

[75] Inventors: Shigehiro Isshiki, Yamatokooriyama; Mitsuho Yamada, Osaka; Yoshiyuki Shiokaramatsu, Settsu, all of Japan

[73] Assignee: Unitta Co., Ltd., Osaka-fu, Japan

[21] Appl. No.: 325,217

[22] PCT Filed: Feb. 23, 1994

[86] PCT No.: PCT/JP94/00280

§ 371 Date: Oct. 21, 1994

§ 102(e) Date: Oct. 21, 1994

[87] PCT Pub. No.: WO94/19620

PCT Pub. Date: Sep. 1, 1994

[30] Foreign Application Priority Data

Feb. 23, 1993 [JP] Japan .................. 5-059443

[51] Int. Cl.$^6$ .................. F16G 1/28; F16G 1/04
[52] U.S. Cl. .................. 474/205; 474/267; 474/268
[58] Field of Search .................. 474/205, 266–268, 474/271

[56] References Cited

U.S. PATENT DOCUMENTS

| | | | |
|---|---|---|---|
| 4,767,389 | 8/1988 | Habegger et al. | 474/263 X |
| 4,826,472 | 5/1989 | Sato et al. | 474/202 |
| 5,171,190 | 12/1989 | Fujiwara et al. | 474/205 X |
| 5,310,386 | 5/1994 | Mizuno et al. | 474/205 |

FOREIGN PATENT DOCUMENTS

| | | |
|---|---|---|
| 0099205 | 1/1984 | European Pat. Off. . |
| 0271587 | 5/1991 | European Pat. Off. . |
| 62-204059 | 12/1987 | Japan . |
| 63-19443 | 1/1988 | Japan . |
| 63-15628 | 5/1988 | Japan . |
| 64-83952 | 3/1989 | Japan . |
| 5-118388 | 5/1993 | Japan . |

Primary Examiner—Roger J. Schoeppel
Attorney, Agent, or Firm—Birch, Stewart, Kolasch & Birch

[57] ABSTRACT

A toothed belt (1) having a woven fabric (5) adhered to its meshing face, wherein the woven fabric (5) has longitudinal yarns (9) extending in the longitudinal direction of the toothed belt (1) and formed of covered yarns (15), each of which is prepared by turning a high tensile strength and heat resistance fiber yarn (17) on a core (16) made of an elastic yarn and by further turning a synthetic fiber yarn (18) on the high tensile strength and heat resistant fiber yarn. The high tensile strength and heat resistance fiber yarn (17) is restrained by the covering synthetic fiber yarn (18) so that it does not protrude in the form of large loops, thereby reducing the bulkiness of the woven fabric (5). As a result, the toothed belt is excellent in wear resistance and durability.

8 Claims, 3 Drawing Sheets

500
TOOTHED BELT

BACKGROUND AND SUMMARY OF THE INVENTION

The present invention relates to a toothed belt for power transmission.

Generally speaking, a toothed belt is constructed, as exemplified by toothed belt 1 in FIG. 1, such that a rubber body 2 has teeth 3 formed on one surface thereof and tensile cords 4 buried therein in its longitudinal direction. A woven fabric 5 is adhered along the tooth-shaped contour to the meshing face of the toothed belt 1.

When this toothed belt 1 is to be manufactured, on the outer circumference of a cylindrical mold 7 formed on its surface with a female mold 6 for the teeth 3, as shown in FIG. 2, there is fitted the cylindrical woven fabric 5 which has been subjected to a treatment with an adhesive, e.g., RFL (i.e., Resoroinol-Formaldehyde-Latex). On this woven fabric 5, there are turned the tensile cords 4 which in turn are covered with rubber 8. When this rubber 8 is heated under pressure, it is forced through the gaps between the tensile cords 4 into the female mold 6, as shown in FIG. 3, so that it is vulcanized into the teeth 3. At this time, the woven fabric 5 is forced together with the rubber 8 into the female mold 6 to form a meshing face along the surfaces of the teeth 3. The woven fabric 5 is required to have initially a length substantially equal to the circumferential length of the toothed belt 1 and, when the teeth 3 are to be formed, a length contouring the teeth of the toothed belt 1. For this requirement to be met, it is necessary that the woven fabric 5 can be easily extended in the longitudinal direction of the toothed belt 1.

In the prior art, as the yarns extensible in the longitudinal direction of the toothed belt 1 stretchable yarns have been used. These yarns will be called hereinafter the "longitudinal yarns 9" of the belt lengthwise direction, whereas the yarns to be combined with the longitudinal yarns 9 will be called the "transverse yarns 10". However, these "longitudinal yarns" and the "transverse yarns" are not necessarily coincident with the terminology "warp" and "weft", as used in the textile structure.

These stretch yarns are exemplified by the woolly processed yarns of nylon or the like, as disclosed in JP, U, S 62-2204059, U.S. Pat. 4,826,472 or European Patent No. 271,587. In recent years, toothed belts are used for driving the camshaft or balancer shaft of an automotive engine, for example. In accordance with the rise in engine performance of recent years, the engine room is subject to high temperatures so that the toothed belt is required to have a sufficient durability even in such a hot atmosphere.

In these years, therefore, it has been examined to employ high tensile strength and heat resistance fiber yarns such as aromatic polyamide fiber yarns as the longitudinal yarns 9 of the woven fabric 5 in the toothed belt.

Generally speaking, however, the high tensile strength and heat resistance fiber yarns are difficult to woolly-process and to have a sufficient stretch. In JP, Y, S63-15628, therefore, it is disclosed to employ as the longitudinal yarns 9 of the woven fabric 5 of the toothed belt 1 the covered yarns 13 each of which has a polyurethane elastic yarn 11 spirally covered with an aramid fiber yarn 12.

As the polyurethane elastic yarn 11 shrinks, the spiral aramid fiber yarn 12 slackens so that the covered yarn 13 can stretch by a length corresponding to the slack. In this covered yarn 13, however, the polyurethane elastic yarn 11 is covered with a sufficiently long aramid fiber yarn 12 so that no mutually restraining force acts between the polyurethane elastic yarn 11 and the aramid fiber yarn 12. As a result, a slip occurs in-between so that the slack of the aramid fiber yarn 12 appears in the form of irregular loops 14 as shown in FIG. 4. If the covered yarn 13 is woven as the longitudinal yarns 9 into the woven fabric 5, the loops 14 protrude from the surface of the woven fabric 5 to make the woven fabric 5 bulky.

In view for the purpose of using the toothed belt 1, the tensile cords 4 are preferably disposed as close to the bottoms of the teeth 3 as possible, so that the woven fabric 5 may be prevented from growing bulky. If, moreover, a number of loops 14 irregularly protrude, they deteriorate appearance of the toothed belt. Still the worse, numerous loops 14 are liable to be worn locally at the bottoms by the contact with the teeth of the pulley so that the toothed belt 1 has its durability deteriorated.

In the aforementioned covered yarn 13, moreover, the aramid fiber yarn 12 is exposed at the outermost portion of the covered yarn 13. As a result, the aramid fiber yarns 12, the rubber of the rubber body 2 and the teeth 3 are directly adhered into an integral structure, in which the aramid fiber yarns 12 are restrained by the rubber to have its degree of freedom lowered. As a result, if the toothed belt 1 is subjected to repeated deformations, the aramid fiber yarns 12 are concomitantly subjected to repeated extensions and bendings whereby their strength lowered due to fatigue thereby causing a serious deterioration in the durability of the toothed belt 1.

The present invention has been accomplished in view of the background thus far described and has the object of providing a toothed belt which is excellent not only in heat resistance but also in wear resistance and durability.

Other objects and further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE INVENTION

According to the present invention there is provided a toothed belt having a woven fabric adhered to the meshing face. This toothed belt is characterized in that the woven fabric has its longitudinal yarns extending in the longitudinal direction of the toothed belt and formed of covered yarns, each of which is prepared by turning a high tensile strength and heat resistance fiber yarn on a core (or wadding) made of an elastic yarn and by further turning a synthetic fiber yarn thereon.

The synthetic fiber yarn may preferably be made of a bulked yarn of nylon fibers or polyester fibers, and the bulked yarn may preferably have a stretch.

Moreover, the synthetic fiber yarn may preferably have a higher covering amount (turns/m) than that of the high tensile strength and heat resistance fiber yarn and may desirably be turned in the opposite direction to that of the high tensile strength and heat resistance fiber yarn.

This high tensile strength and heat resistance fiber yarn in the present invention is preferably made of the fibers which have far higher tensile strength and heat resistance than those of the synthetic fiber yarn, which have a tensile strength of 10 g/d or higher and which can be used at temperatures of as high as 200° C. or more. This high tensile strength and heat resistance fiber yarn may be suitably exemplified by the aromatic polyamide fiber yarn but can also be exemplified by a yarn made of polyarylate fibers, metallic fibers, carbon fibers or glass fibers.

Moreover, this high tensile strength and heat resistance fiber yarn may preferably be exemplified by a spun yarn or a bulked yarn. Bulked yarn is yarn which is processed so as to be bulky. There are two types of bulked yarns, of which one is a wooly processed yarn which is stretchable and the other is a twisted non-stretchable long filament yarn processed by crimping. Unknown filament yarns are quite different from bulked yarns in that the former are non-processed filaments (see column 11 of U.S. Pat. No. 4,723,579 in this respect).

Figure 1:
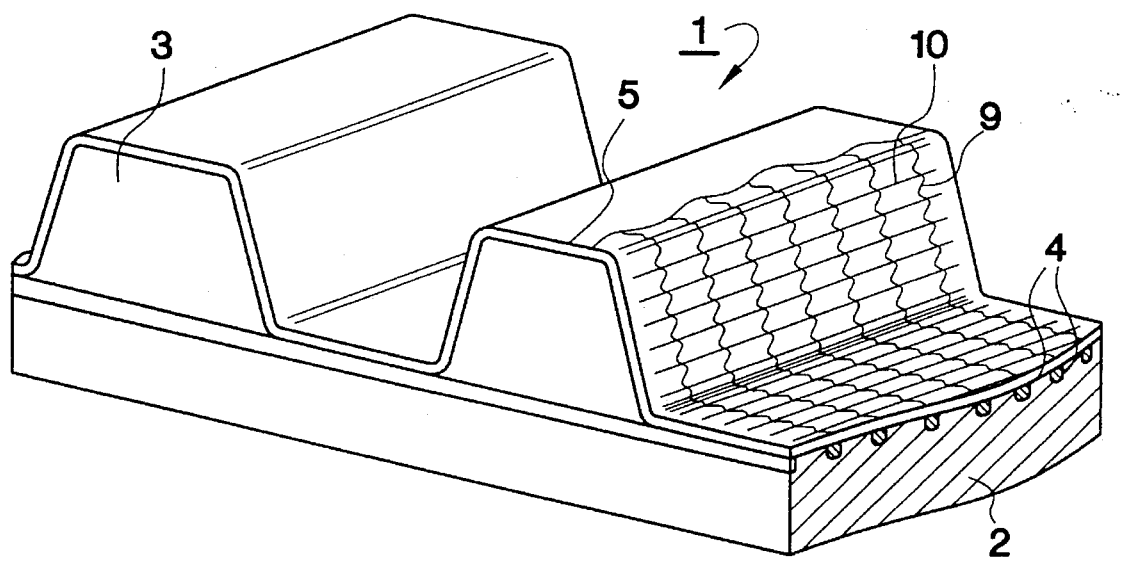
FIG. 1 is a perspective view showing a toothed belt of the present invention.
Figure 2:
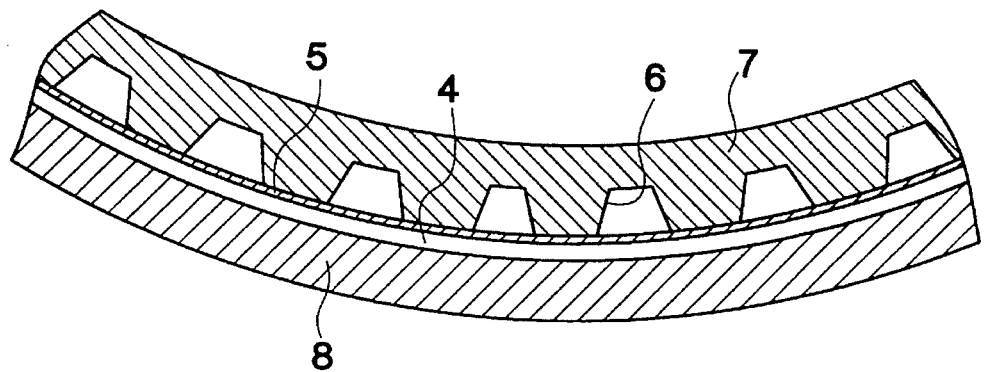
FIG. 2 is a longitudinal section showing the state in which the toothed belt is to be manufactured.
Figure 3:
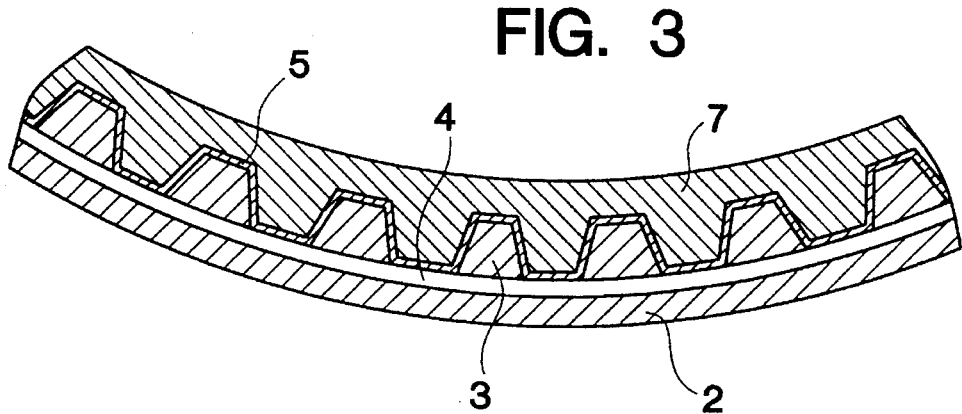
FIG. 3 is a longitudinal section showing the state in which the toothed belt is manufactured.
Figure 4:
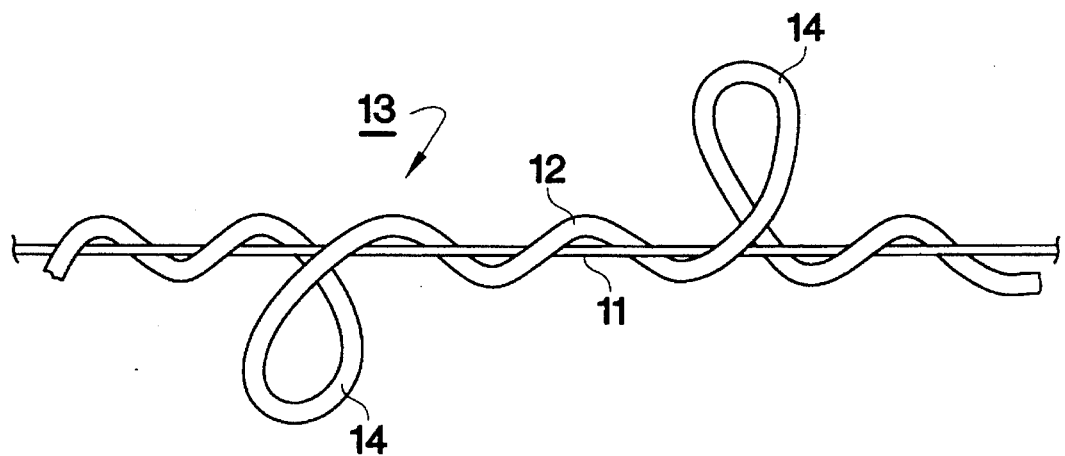
FIG. 4 is a front elevation showing a covered yarn of the prior art.
Figure 5:
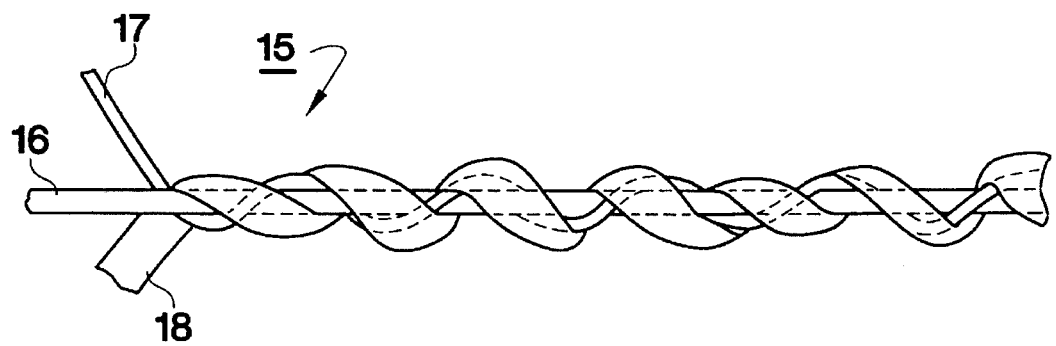
FIG. 5 is a front elevation showing a covered yarn to be used as the longitudinal yarn of a woven fabric of the present invention.

FIG. 5 shows a covered yarn 15 to be employed in the present invention. This covered yarn 15 has its core (or wadding) 16 made of an elastic yarn such as a polyurethane elastic yarn.

Reference numeral 17 designates an aromatic polyamide fiber yarn which is employed as the high tensile strength and heat resistance fiber yarn which is spirally turned on the cores 16. The aromatic polyamide fiber yarn 17 may preferably be exemplified by a spun yarn or a bulked yarn.

Numeral 18 designates a synthetic fiber yarn which is made of nylon fibers or polyester fibers and which is spirally turned on the aforementioned aromatic polyamide fiber yarn 17. The synthetic fiber yarn 18 may preferably be exemplified by a crimped yarn of nylon fibers or polyester fibers.

When the synthetic fiber yarn 18 is to be turned on the aromatic polyamide fiber yarn 17, it may preferably be spirally turned in the opposite direction to the turning direction of the aromatic polyamide fiber yarn 17 on the cores 16 and in a higher covering amount than that of the aromatic polyamide fiber yarn 17 on the cores 16.

Thus, the aforementioned woven fabric 5 is woven of the aforementioned covered yarns 15 as the longitudinal yarns 9 and arbitrary yarns as the transverse yarns 10. In this weaving operation, either of the longitudinal yarns 9 and the transverse yarns 10 may be used as the warp or the weft.

The woven fabric 5 thus obtained is adhered to the surfaces of the teeth of the toothed belt 1. The toothed belt 1 employing the woven fabric 5 can be manufactured absolutely like the toothed belt 1 of the prior art.

In the toothed belt according to the present invention, the covered yarns 15 as the longitudinal yarns 9 are prepared by covering the cores 16 of elastic yarns with the high tensile strength and heat resistance fiber yarns 17 and by further covering them with the synthetic fiber yarns 18. As a result, the high tensile strength and heat resistance fiber yarns 17, which are stiff and inferior in wear resistance, are covered with and protected by the synthetic fiber yarns 18 so that the high tensile strength and heat resistance fiber yarns 17 are neither exposed directly to the outside nor are worn.

Moreover, the synthetic fiber yarns 18 are adhered to the rubber constituting the toothed belt 1, whereas the high tensile strength and heat resistance fiber yarns 17 are enclosed by the synthetic fiber yarns 18 and are kept away from the direct restraint by the rubber so that they can have a large degree of freedom and can be freed from any fatigue due to the extension and the bending.

Still moreover, the synthetic fiber yarns 18 are exemplified by the bulked yarns to increase the friction coefficient between the synthetic fiber yarns 18 and the high tensile strength and heat resistance fiber yarns 17. Furthermore, the high tensile strength and heat resistance fiber yarns 17 are held in the synthetic fiber yarns 18, which are so bulked as to enclose the high tensile strength and heat resistance fiber yarns 17 therein thereby preventing the same from being exposed to the outside, so that the wear resistance and the durability are further improved.

In order to improve the adhesion between the woven fabric 5 and the rubber, the woven fabric 5 may be subjected to treatment with an adhesive such as RFL. When the bulked yarns are used, the treating agent will easily penetrate through the fibers of the synthetic fiber yarns 18 so that its amount can be increased to improve the adhesion to the rubber further.

Furthermore, when the bulked yarns used have a stretch, they can be easily turned but have no excessive stretch because they shrink after turned and can hold the high tensile strength and heat resistance fiber yarns 17 while blocking the exposure of the same.

By making the covering amount of the synthetic fiber yarns 18 more than that of the high tensile strength and heat resistance fiber yarns 17, the high tensile strength and heat resistance fiber yarns 17 can be more reliably held and can be prevented from being exposed to the outside.

Furthermore, turning the synthetic fiber yarns 18 in the opposite direction to that of the high tensile strength and heat resistance fiber yarns 17, the high tensile strength and heat resistance fiber yarns 17 can be held on the surfaces of the cores 16 by the synthetic fiber yarns 18 so that they can be effectively prevented from being exposed at the surfaces.

Furthermore, when the high tensile strength and heat resistance fiber yarns 17 are made of spun yarns or bulked yarns which are so soft as to have a low stiffness and thus becomes easily entangled on the synthetic fiber yarns 18, the high tensile strength and heat resistance fiber yarns 17 are not subject to the formation of irregular loops and hence are prevented from being exposed at the surfaces of the covered yarns 15.

According to the present invention, the high tensile strength and heat resistance fiber yarns 17 which are excellent in tensile strength and heat resistance are used in the longitudinal yarns 9 for the woven fabric 5 of the toothed belt 1, so that the woven fabric 5 can acquire a high tensile strength. Also, the longitudinal yarns 9 per se can be protected from being worn or becoming deteriorated by the frictional heat even when the woven fabric 5 comes into contact with pulleys which drive them. As a result, it is possible to provide a toothed belt 1 having a remarkably excellent durability while preventing the woven fabric 5 from being cut and the teeth 3 from cracking.

In the toothed belt of the present invention, the high tensile strength and heat resistance fiber yarns 17 are turned on the cores 16 and are restrained externally thereof by the synthetic fiber yarns 18. As a result, the high tensile strength and heat resistance fiber yarns 17 are spirally arranged on the cores 16 and can be spirally extended, although they per se have no stretch, to give a high stretch to the covered yarns 15. As a result, the woven fabric 5 can be given a high stretch in the longitudinal direction of the toothed belt 1 so that the toothed belt 1 can be easily molded. Even if, moreover, the loops 14 are formed in the covered yarns 15 by the curling of the high tensile strength and heat resistance fiber yarns 17, they will never be large, nor will they be irregularly formed on the surface of the woven fabric 5 because the high tensile strength and heat resistance fiber yarns 17 are externally restrained by the synthetic fiber yarns 18. Thus, the woven fabric 5 can be restrained from becoming unnecessarily bulky.

As a result, the woven fabric 5 can be given an excellent appearance and made soft and thin, and the tensile cords 4 of the toothed belt 1 can be formed extremely close to the teeth bottoms to give an excellent performance to the toothed belt 1.

Furthermore, the rubber in the toothed belt 1 is in contact with the synthetic fiber yarns 18 at the outermost layer so that adhesion is improved. At the same time, the high tensile strength and heat resistance fiber yarns 17 held under the synthetic fiber yarns 18 are not restrained by the rubber so that they acquire a high degree of freedom. As a result, the high tensile strength and heat resistance fiber yarns 17 are prevented from becoming locally worn or from having their tensile strength deteriorated by fatigue due to extension or bending, whereby they possess excellent wear resistance and durability.

The present invention will now be illustrated in connection with its Examples. The woven fabrics used were manufactured according to the requirements, as specified in the following individual Examples and Comparisons.

EXAMPLE 1

Longitudinal Yarns: Covered Yarns
    Cores: Polyurethane Elastic Yarns of 420 d
    Aromatic Polyamide Fiber Yarns:
        Multi-Filament Yarns of 200 d
        Covering Direction: S
        Covering Amount: 650 turns/m
    Synthetic Fiber Yarns: Yarns of Nylon 66
        Multi-Filament Yarns of 100 d
        Covering Direction: Z
        Covering Amount: 850 turns/m
    With the cores being extended by about 1.7 times, the aromatic polyamide fiber yarns and the synthetic fiber yarns were turned, as described above, and were then returned approximately to the original length of the cores.
    Transverse Yarns: Yarns of Nylon 66
        Multi-Filament Yarns of 210 d
    Construction of Woven Fabric: 2/2 Twill Weave
    Picked Number:   Longitudinal Yarns - 80 yarns/25 mm
                             Transverse Yarns - 82 yarns/25 mm

EXAMPLE 2

Longitudinal Yarns: Covered Yarns
    Cores: Polyurethane Elastic Yarns of 420 d
    Aromatic Polyamide Fiber Yarns:
        Spun Yarns of 200 d -continued Covering Direction: S
        Covering Amount: 650 turns/m
    Synthetic Fiber Yarns: Yarns of Nylon 66
        Woolly Processed Yarns of 100 d
        Covering Direction: Z
        Covering Amount: 850 turns/m
    The covering method was identical to that of Example 1.
    Transverse Yarns: Yarns of Nylon 66
        Multi-Filament Yarns of 210 d
    Construction of Woven Fabric: 2/2 Twill Weave
    Picked Number:   Longitudinal Yarns - 80 yarns/25 mm
                             Transverse Yarns - 82 yarns/25 mm Comparison 1:
    Longitudinal Yarns: Covered Yarns
        Cores: Polyurethane Elastic Yarns of 420 d
        Aromatic Polyamide Fiber Yarns:
            Multi-Filament Yarns of 200 d
            Covering Direction: S
            Covering Amount: 650 turns/m
        The covering method was identical to that of Example 1.
However, the synthetic fiber yarns are not turned.
    Transverse Yarns: Yarns of Nylon 66
        Multi-Filament Yarns of 210 d
    Construction of Woven Fabric: 2/2 Twill Weave
    Picked Number:   Longitudinal Yarns - 86 yarns/25 mm
                             Transverse Yarns - 82 yarns/25 mm Comparison 2:
    Longitudinal Yarns: Covered Yarns
        Cores: Polyurethane Elastic Yarns of 420 d
        Aromatic Polyamide Fiber Yarns:
            Multi-Filament Yarns of 100 d
            Covering Direction: S
            Covering Amount: 650 turns/m
        Aromatic Polyamide Fiber Yarns:
            Multi-Filament Yarns of 100 d
            Covering Direction: Z
            Covering Amount: 850 turns/m
        The covering method was identical to that of Example 1.
    Transverse Yarns: Yarns of Nylon 66
        Multi-Filament Yarns of 210 d
    Construction of Woven Fabric: 2/2 Twill Weave
    Picked Number:   Longitudinal Yarns - 86 yarns/25 mm
                             Transverse Yarns - 82 yarns/25 mm The thicknesses and strengths of the individual woven fabrics obtained by the above-specified Examples and Comparisons are as shown in the following Table 1:

TABLE 1

|  | Thickness (mm) | Strength (Kgf/25 mm) |
| --- | --- | --- |
| Example 1 | 1.20 | 300 |
| Example 2 | 1.05 | 296 |
| Comparison 1 | 1.82 | 350 |
| Comparison 2 | 1.52 | 305 |

The individual woven fabrics of the aforementioned Examples and Comparisons were used to manufacture the toothed belts (pitch of teeth: 9.525 mm; the number of teeth: 92 and belt width: 19.1 mm), which had the woven fabrics adhered to the meshing faces of their teeth.

Durability Tests

Figure 6:
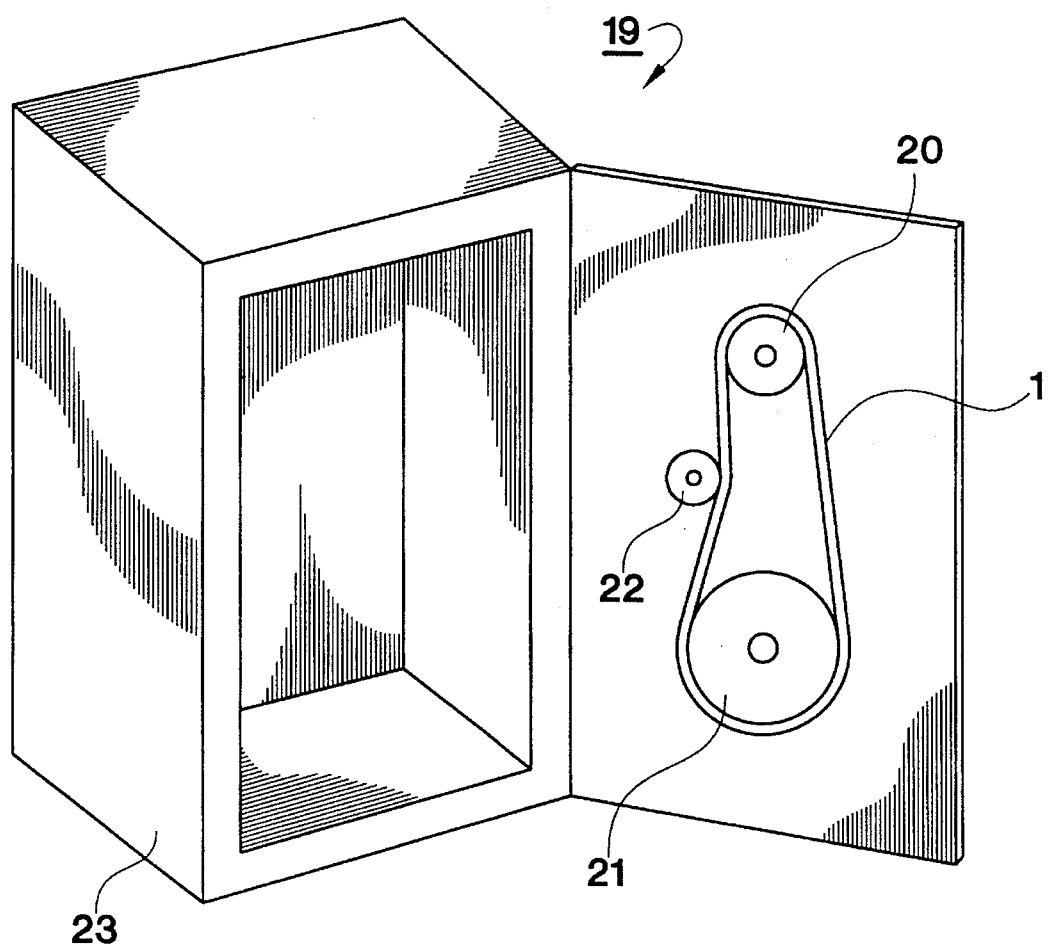
FIG. 6 is a perspective view showing a test machine for testing the durability of toothed belts.

These individual toothed belts were subjected to running tests by using a test machine 19, as shown in FIG. 6. This test machine 19 is constructed such that the toothed belt 1 was made to run on a drive pulley 20 (the number of teeth: 20) and a driven pulley 21 (the number of teeth: 40). The tension was adjusted by means of an idler pulley 22. The test machine 19 thus constructed was accommodated in a heating box 23. This heating box 23 had its inside set to a predetermined temperature condition, and the toothed belt 1 was rotationally driven by the drive pulley 20 to have its durability measured.

The testing conditions were set such that the inside of the heating box 23 was at a temperature of 120° C. or 140° C. and such that the drive pulley 20 was driven at 6,000 r.p.m.

The test results are as shown in the following Table 2:

TABLE 2

| Temp. Condition | 120° C. | 140° C. |
| --- | --- | --- |
| Example 1 | 1,250 hrs. | 850 hrs. |
|  | Tooth Bottoms Worn | Teeth Cracked |
| Example 2 | 2,000 hrs. | 1,250 hrs. |
|  | No Wear | Teeth Cracked |
| Comparison 1 | 250 hrs. | 50 hrs. |
|  | Tooth Bottoms Worn | Tooth Bottoms Worn |
| Comparison 2 | 300 hrs. | 100 hrs. |
|  | Tooth Bottoms Worn | Tooth Bottoms Worn |

In the toothed belts of the present invention, as can be seen from Table 1, the woven fabric can be made thinner than that of the structure of the prior art even if its quantity of yarn is almost equal.

It can also be seen from Table 2 that the toothed belts of the present invention are remarkably improved in wear resistance and durability over those of the prior art even if the tensile strength of the woven fabric is lower.

It is also to be noted that the structure of Example 1 has a durability 4 to 5 times under the condition of 120° C. and 8.5 to 17 times under the condition of 140° C. as high as that of the Comparisons, and that the structure of Example 2 employing crimped yarns as the synthetic fiber yarns 18 has a durability 1.5 times as high as that of Example 1.

Thus, the toothed belt of the present invention has an excellent durability especially in a hot atmosphere. Incidentally, any structures, in which the yarns of nylon 66 or the polyester fiber yarns were used in place of the aromatic polyamide fiber yarns 17 of the present invention, were not subjected to comparison test. In view of the heat resistances of those fibers, however, the structures are estimated to wear remarkably rapidly under high temperature atmospheres as specified above.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A toothed belt having a woven fabric adhered to its meshing face, said woven fabric having longitudinal yarns extending in the longitudinal direction of said toothed belt and formed of covered yarns, each of which is prepared by turning a high tensile strength and heat resistance fiber yarn on a core made of an elastic yarn and by further turning a synthetic fiber yarn thereon.

2. The toothed belt as set forth in claim 1, wherein said high strength and heat resistance fiber yarn is an aromatic polyamide fiber yarn.

3. The toothed belt as set forth in claim 1, wherein said synthetic fiber yarn is a bulked yarn of nylon fibers or polyester fibers.

4. The toothed belt as set forth in claim 3, wherein said bulked yarn has a stretch.

5. The toothed belt as set forth in claim 1, wherein said synthetic fiber yarn has a higher covering amount than that of said high tensile strength and heat resistance fiber yarn.

6. The toothed belt as set forth in claim 1, wherein said high tensile strength and heat resistance fiber yarn is a spun yarn or a bulked yarn.

7. The toothed belt as set forth in claim 1, wherein said synthetic fiber yarn is turned in the opposite direction to that of said high tensile strength and heat resistance fiber yarn.

8. The toothed belt as set forth in claim 1 wherein the high tensile strength and heat resistance fiber yarn is made of fibers selected from the group consisting of polycarbonate fibers, metallic fibers, carbon fibers or glass fibers.

* * * * *